United States Patent
Ono

(10) Patent No.: US 9,732,665 B2
(45) Date of Patent: *Aug. 15, 2017

(54) COMPRESSION IGNITION INTERNAL COMBUSTION ENGINE

(71) Applicant: TOYOTA JIDOSHA KABUSHIKI KAISHA, Toyota-shi, Aichi-ken (JP)

(72) Inventor: Tomoyuki Ono, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/898,893

(22) PCT Filed: Jun. 20, 2013

(86) PCT No.: PCT/JP2013/066996
§ 371 (c)(1),
(2) Date: Dec. 16, 2015

(87) PCT Pub. No.: WO2014/203381
PCT Pub. Date: Dec. 24, 2014

(65) Prior Publication Data
US 2016/0265417 A1    Sep. 15, 2016

(51) Int. Cl.
*F02B 5/00* (2006.01)
*F02B 23/06* (2006.01)
*F02F 3/22* (2006.01)
*F02M 45/04* (2006.01)
*F02M 61/18* (2006.01)

(52) U.S. Cl.
CPC ...... *F02B 23/0645* (2013.01); *F02B 23/0696* (2013.01); *F02M 61/1806* (2013.01); *F02B 23/0675* (2013.01); *F02F 3/22* (2013.01); *F02M 45/04* (2013.01); *F02M 61/1826* (2013.01); *Y02T 10/125* (2013.01)

(58) Field of Classification Search
CPC .. F02B 7/00; F02B 3/06; F02B 17/005; F02B 2275/48; F02B 23/101; F02M 61/1813; F02M 61/182
USPC ......................... 123/294, 301, 305
See application file for complete search history.

(56) References Cited

U.S. PATENT DOCUMENTS

| | | | |
|---|---|---|---|
| 2002/0033163 A1* | 3/2002 | Takashiba | F02B 23/101 123/295 |
| 2003/0005907 A1* | 1/2003 | Nakakita | F02B 23/0621 123/295 |
| 2003/0056748 A1* | 3/2003 | Yu | F02B 23/104 123/262 |
| 2005/0098145 A1* | 5/2005 | Tsuchida | F02B 17/005 123/299 |

(Continued)

FOREIGN PATENT DOCUMENTS

| | | |
|---|---|---|
| DE | 102010027637 A1 | 1/2012 |
| EP | 2112348 A2 | 10/2009 |

(Continued)

*Primary Examiner* — John Kwon
(74) *Attorney, Agent, or Firm* — Finnegan, Henderson, Farabow, Garrett & Dunner LLP

(57) ABSTRACT

A compression ignition internal combustion engine includes: a cylinder block and a cylinder head; a piston including a cavity that defines a combustion chamber in cooperation with the cylinder block and the cylinder head; and a nozzle for injecting fuel into the combustion chamber.

15 Claims, 21 Drawing Sheets

(56) References Cited

U.S. PATENT DOCUMENTS

| | | | |
|---|---|---|---|
| 2007/0235004 A1* | 10/2007 | Yi | F02B 17/005 |
| | | | 123/298 |
| 2008/0022967 A1* | 1/2008 | Tanaka | F02B 23/101 |
| | | | 123/305 |
| 2012/0234285 A1* | 9/2012 | Venugopal | F02B 23/0651 |
| | | | 123/193.6 |
| 2016/0138461 A1* | 5/2016 | Ono | F02F 3/22 |
| | | | 123/294 |
| 2016/0201596 A1* | 7/2016 | Nagano | F02F 1/242 |
| | | | 123/305 |

FOREIGN PATENT DOCUMENTS

| | | |
|---|---|---|
| JP | 57-25117 | 7/1980 |
| JP | 2-90326 | 7/1990 |
| JP | 4-69635 | 6/1992 |
| JP | 4-219417 | 8/1992 |
| JP | 8-296442 | 11/1996 |
| JP | 2001-90542 | 4/2001 |
| JP | 2001-214742 | 8/2001 |
| JP | 2002-48001 | 2/2002 |
| JP | 2004-84618 | 3/2004 |
| JP | 2005-194971 | 7/2005 |
| JP | 2009-215978 | 9/2009 |
| JP | 2010-53710 | 3/2010 |
| JP | 2011-185242 | 9/2011 |

* cited by examiner

COMPRESSION IGNITION INTERNAL COMBUSTION ENGINE

CROSS-REFERENCE TO RELATED APPLICATIONS

This application is a national phase application of International Application No. PCT/JP2013/066996, filed Jun. 20, 2013, the content of which is incorporated herein by reference.

TECHNICAL FIELD

The present invention is related to a compression ignition internal combustion engine.

BACKGROUND ART

A piston of an internal combustion engine is formed with a cavity. Patent Documents 1 to 6 disclose a piston formed with a cavity. There are, for example, a reentrant type and an open type as a shape of the cavity.

PRIOR ART DOCUMENT

Patent Document

[Patent Document 1] Japanese Unexamined Patent Application Publication No. 2001-090542
[Patent Document 2] Japanese Unexamined Patent Application Publication No. 2011-185242
[Patent Document 3] Japanese Unexamined Patent Application Publication No. 04-219417
[Patent Document 4] Japanese Unexamined Patent Application Publication No. 2001-214742
[Patent Document 5] Japanese Unexamined Patent Application Publication No. 2010-053710
[Patent Document 6] Japanese Unexamined Patent Application Publication No. 2009-215978

SUMMARY OF THE INVENTION

Problems to be Solved by the Invention

In the reentrant type, a squish flow can promote mixing fuel and air. This can reduce, for example, smoke. However, the burned gas flows over a piston top surface, so that fuel consumption might be degraded by heat loss of the piston.

In the open type, a squish area is small, so that the burned gas is suppressed from flowing over the piston top surface, thereby suppressing the deterioration in the fuel consumption. However, the squish flow is not secured enough to promote mixing fuel and air, so smoke might be degraded.

The present invention has been made in view of the above problems and has an object to provide a compression ignition internal combustion engine with improved performance.

Means for Solving the Problems

The above object is achieved by a compression ignition internal combustion engine including: a cylinder block and a cylinder head; a piston including a cavity that defines a combustion chamber in cooperation with the cylinder block and the cylinder head; and a nozzle for injecting fuel into the combustion chamber, wherein the cavity includes: a raised portion raised toward the nozzle; a bottom surface formed around the raised portion; and an open surface and a reentrant surface that are continuous to the bottom surface, a depth of the open surface becomes shallower toward a radially outer side of the piston, a distance from the nozzle to the open surface is greater than a distance from the nozzle to the reentrant surface, a height position, in a central axis direction of the piston, of a ridgeline between the bottom surface and the open surface is lower than a height position, in the central axis direction of the piston, of a ridgeline between the bottom surface and the reentrant surface, and the nozzle injects first and second fuel sprays toward the open surface and the reentrant surface, respectively.

The bottom surface may be configured to include a raised bottom surface portion partially raised and positioned between the raised portion and the open surface.

The nozzle may be configured to inject a third fuel spray between the first and second fuel sprays.

The nozzle may be configured to inject a fourth fuel spray sandwiching the first fuel spray in cooperation with the third fuel spray, when the piston is viewed in the central axis direction, a distance to the nozzle from a point where an outer circumferential edge of the open surface intersects a direction of the third fuel spray may be configured to be greater than a distance to the nozzle from a point where the outer circumferential edge of the open surface intersects a direction of the fourth fuel spray.

The piston may be configured to be formed with a valve recess surface continuous to the open surface and positioned higher than the open surface in the central axis direction.

The piston may be configured to include a top surface positioned higher than the valve recess surface in the central axis direction, and the top surface, the valve recess surface, and the open surface may be configured to be arranged in this order in a direction of a swirl flow generated in the combustion chamber.

The piston may be configured to include a top surface positioned higher than the valve recess surface in the central axis direction, and the open surface, the valve recess surface, and the top surface may be configured to be arranged in this order in a direction of a swirl flow generated in the combustion chamber.

A height position, in the central axis direction, of the first fuel spray may be configured to be higher than a height position of the second fuel spray.

When viewed in the central axis direction, an angular interval between the first and third fuel sprays may be configured to be smaller than an angular interval between the second and third fuel sprays.

The piston may be configured to be provided with a cooling channel through which oil flows along the open surface, and the cooling channel may not be configured to be provided radially outward from the reentrant surface.

The piston may be configured to be provided with a cooling channel through which oil flows along the reentrant surface, and the cooling channel may not be configured to be provided radially outward from the open surface.

The open surface may be configured to include first and second open surfaces facing each other through the central axis, and when viewed in the central axis direction, a direction in which the first and second open surfaces are arranged may be configured to be positionally displaced from a direction in which a crankshaft extends.

When viewed in the central axis direction, a direction in which two intake valves are arranged may be configured to be positionally displaced from a direction in which the crankshaft extends and to be positionally displaced in a direction of a swirl flow generated in the combustion chamber.

The number of the fuel sprays injected to the open surface may be configured to be greater than the number of the fuel sprays injected to the reentrant surface.

D1 may stand for a maximum distance between the first and second open surfaces when viewed in the central axis direction, D2 may stand for a maximum distance between the first and second reentrant surfaces when viewed in the central axis direction, the nozzle may be formed with plural injection holes at equal intervals around the central axis, A (rad) may stand for an equal angular interval between adjacent injection holes, and following expressions 1 and 2 may be configured to be satisfied.

$$A \times D2/2 > 5 \quad \text{(Expression 1)}$$

$$2 > D1/D2 > 1.05 \quad \text{(Expression 2)}$$

The nozzle may be configured to include first and second injection holes respectively injecting the first and second fuel sprays, and a length of the first injection hole may be configured to be greater than a length of the second injection hole.

The nozzle may be configured to include first and second injection holes respectively injecting the first and second fuel sprays, and a diameter of the first injection hole may be configured to be larger than a diameter of the second injection hole.

Effects of the Invention

It is possible to provide a compression ignition internal combustion engine with improved performance.

MODES FOR CARRYING OUT THE INVENTION

Embodiments according to the present invention will be described with reference to drawings.

Figure 1:
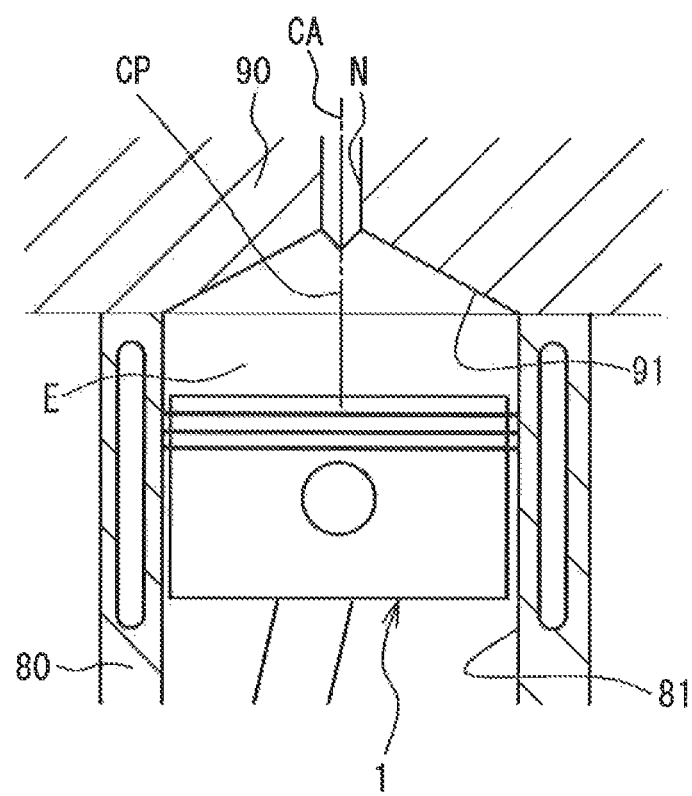
FIG. 1 is an illustration of an internal combustion engine of a compression ignition type.

FIG. 1 is an explanatory view of an internal combustion engine of a compression ignition type. The internal combustion engine of the compression ignition type is, for example, a diesel engine. The internal combustion engine can be an internal combustion engine that generates a swirl flow in a combustion chamber E. A cylinder 81 is formed in a cylinder block 80. A piston 1 is accommodated in the cylinder 81. A cylinder head 90 is fixed to an upper portion of the cylinder block 80.

The cylinder head 90, the cylinder block 80, and the piston 1 define the combustion chamber E. A central portion 91, defining the combustion chamber E, of a bottom wall portion of the cylinder head 90 has a pent roof shape, but is not limited thereto.

The cylinder head 90 is provided two intake ports and two exhaust ports not illustrated. The intake port and the exhaust port are opened/closed by an intake valve and an exhaust valve, respectively.

A nozzle N for injecting fuel is provided in the cylinder head 90. The nozzle N injects fuel to the combustion chamber E. The nozzle N is disposed substantially on a central axis CP. The central axis CP is an central axis of the cylinder block 80. Additionally, the nozzle N is provided with eight injection holes for injecting fuel, but is not limited to this.

Figure 2:
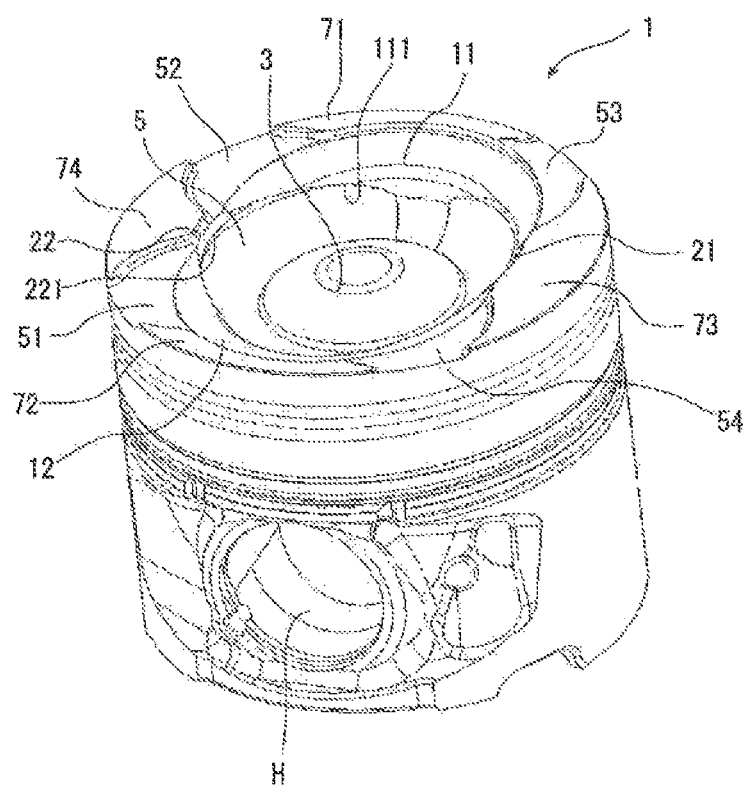
FIG. 2 is a perspective view of a piston.
Figure 3:
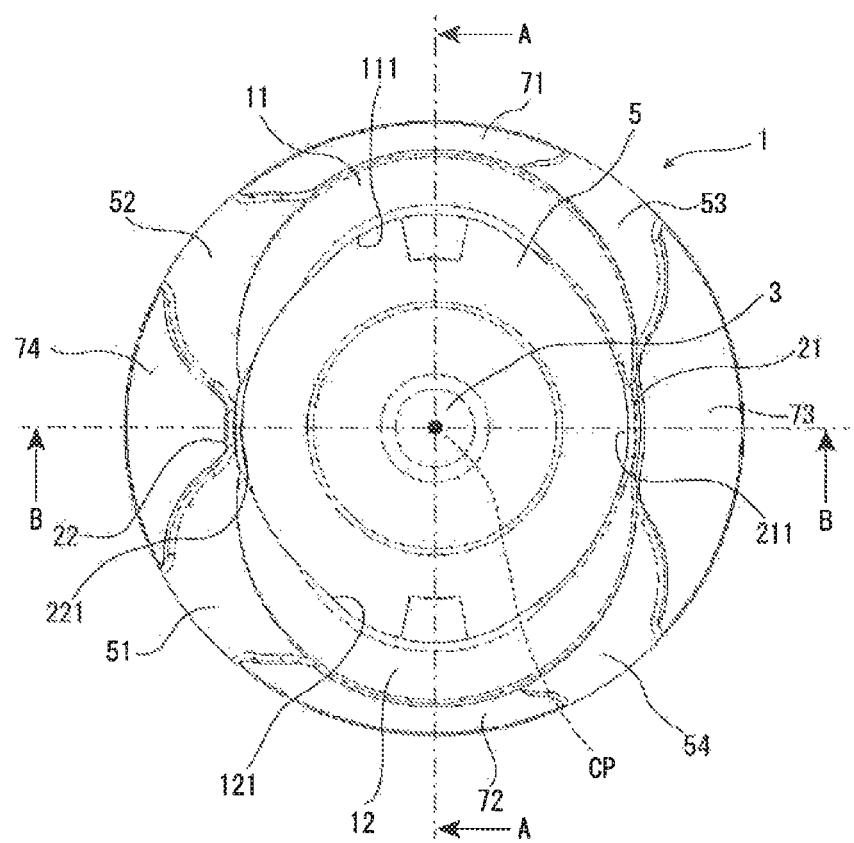
FIG. 3 is a top view of the piston.
Figure 4:
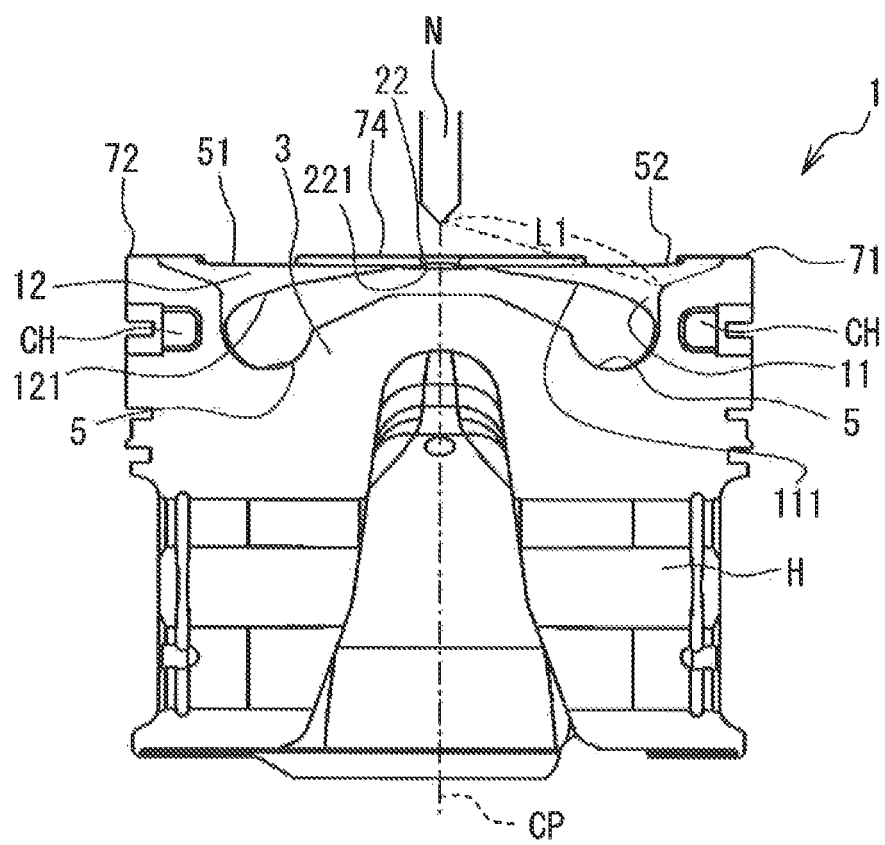
FIG. 4 is a cross-sectional view taken along A-A line of FIG. 3.
Figure 5:
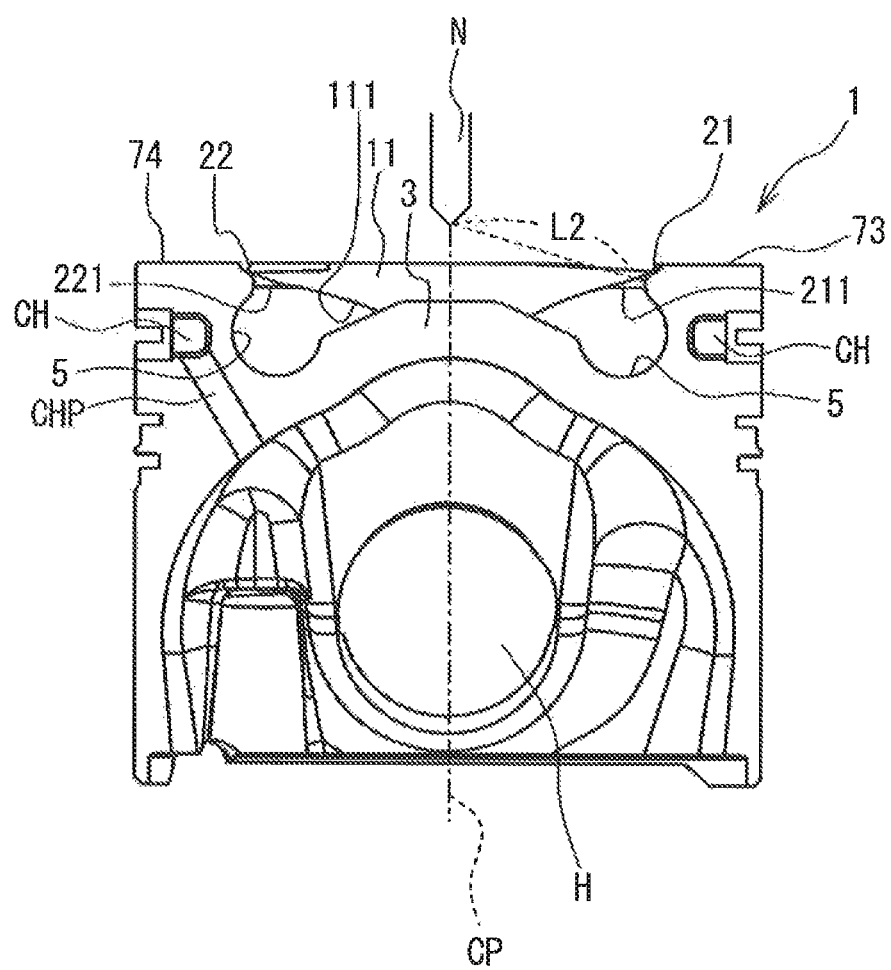
FIG. 5 is a cross-sectional view taken along B-B line of FIG. 3.

FIG. 2 is a perspective view of the piston 1. FIG. 3 is a top view of the piston 1. FIG. 4 is a cross-sectional view taken along A-A line of FIG. 3. FIG. 5 is a cross-sectional view taken along B-B line of FIG. 3. An upper portion of the piston 1 is formed with a cavity to which fuel is injected. A lower portion of the piston 1 is formed with a hole H into which a pin is inserted for coupling a connecting rod.

The cavity is formed into a concave shape, and it is specifically configured as follows. It includes: a raised portion 3 raised from the central portion toward the nozzle N side, that is, toward the upper side; and a bottom surface 5 formed around the raised portion 3. When viewed from the top, the cavity has a substantially elliptical shape as illustrated in FIG. 3. As illustrated in FIGS. 4 and 5, the bottom surface 5 has a substantially arcuate shape in the cross-section view.

Two open surfaces 11 and 12 and two reentrant surfaces 21 and 22 are formed and continuous to the bottom surface 5. The open surfaces 11 and 12 face each other through the central axis CP. The same is true for the reentrant surfaces 21 and 22. The reentrant surface 21 is located between the open surfaces 11 and 12. In other words, the open surface 11, the reentrant surface 21, the open surface 12, and the reentrant surface 22 are arranged in this order in the circumferential direction. In the top view, a line passing through the approximate centers of the open surfaces 11 and 12 is perpendicular to a line passing through the approximate centers of the reentrant surfaces 21 and 22. The open surface 11, the reentrant surface 21, the open surface 12, and the reentrant surface 22 are arranged at 90 degree angular intervals. As illustrated in FIG. 3, when viewed from the top, the open surfaces 11 and 12 are substantially symmetrical with respect to the central axis CP. The same is true for the reentrant surfaces 21 and 22.

The open surfaces 11 and 12 each becomes shallower toward the radially outer side. As illustrated in FIGS. 2 and 3, each area of the open surfaces 11 and 12 is greater than each area of the reentrant surfaces 21 and 22. Each length of the open surfaces 11 and 12 in the circumferential direction is greater than each length of the reentrant surfaces 21 and 22 in the circumferential direction. Each maximum length of the open surfaces 11 and 12 in the radial direction is greater than each maximum length of the reentrant surfaces 21 and 22 in the radial direction. Here, the circumferential direction means a circumferential direction around the central axis CP, and the radial direction means a radial direction from the central axis CP. Further, the maximum distance between the open surfaces 11 and 12 in the direction perpendicular to the central axis CP is greater than the maximum distance between the reentrant surfaces 21 and 22.

A ridgeline 111 indicates a boundary between the open surface 11 and the bottom surface 5. Similarly, ridgelines 121, 211, and 221 indicate a boundary between the open surface 12 and the bottom surface 5, a boundary between the reentrant surface 21 and the bottom surface 5, and a boundary between the reentrant surface 22 and the bottom surface 5, respectively. Each of the ridgelines 111 and 121 is located lower than each of the ridgelines 211 and 221 in the direction of the central axis CP.

Additionally, the ridgelines 211 and 221 of the reentrant surfaces 21 and 22 are respectively formed at positions which are visible in the top view, but they may not be visible. That is, a ridgeline may be formed closer to the bottom surface 5 side than to a lip portion on the reentrant surface closest to the central axis.

A shape of the cavity of the piston 1 is the open type in the cross section of FIG. 4, and is the reentrant type in the cross section of FIG. 5. In FIG. 5, the cavity shape is the reentrant type in which an inner diameter partially becomes smaller toward the upper side. In contrast, in FIG. 4, the cavity shape is the open type in which the inner diameter does not become smaller toward the upper side. Thus, the cavity shape of the piston 1 is a partial open-type and a partial reentrant type. As illustrated in FIGS. 4 and 5, the bottom surface 5 has an arcuate shape in the cross-sectional view. As illustrated in FIG. 5, the maximum radius of the bottom surface 5 from the central axis CP is greater than a distance from the central axis CP to the reentrant surface 21 in the direction perpendicular to the central axis CP, but is not limited to this. In the cross section intersecting the open surfaces 11 and 12, the cavity shape may be an open type in which the inner diameter becomes greater toward the upper side.

FIGS. 4 and 5 illustrate the position of the nozzle N when the piston 1 is positioned at the top dead center. A distance L1 from a distal end of the nozzle N to the open surface 11 is greater than a distance L2 from the distal end of the nozzle N to the reentrant surface 21. The distance L1 is a distance in the injection direction of the fuel spray injected from the nozzle N to the open surface 11. The distance L2 is a distance in the injection direction of the fuel spray injected from the nozzle N to the reentrant surface 21. In other words, the distances L1 and L2 are distances in axial directions of injection holes injecting fuel to the open surface 11 and the reentrant surface 21, respectively. Additionally, an angle of the direction of the fuel spray injected to the open surface 11 with respect to the central axis CP is equal to an angle of the direction of the fuel spray injected to the reentrant surface 21 with respect to the central axis C, but is not limited to this.

Valve recess surfaces 51 to 54 are formed in the radial outer side from the open surfaces 11 and 12 and the reentrant surfaces 21 and 22. The valve recess surface 51 and 52 are shaped into shallow recesses to avoid contacting with the two intake valves, respectively. Valve recess surfaces 53 and 54 are shaped into shallow recesses to avoid contacting with the two exhaust valves, respectively. The valve recess surface 51 to 54 are located at approximately the same height in the direction of the central axis CP. The valve recess surfaces 51 to 54 are located higher than the open surfaces 11 and 12 and the reentrant surfaces 21 and 22.

Top surfaces 71 to 74 are located higher than the valve recess surfaces 51 to 54. The top surfaces 71 to 74 are located on the same plane. The top surface 71 is located radially outward from the open surface 11 and between the valve recess surfaces 52 and 53. The top surface 72 is located in such a position as to face the top surface 71 through the central axis CP, and is located radially outward from the open surface 12 and between the valve recess surfaces 51 and 54. The top surface 73 is located radially outward from the reentrant surface 21 and between the valve recess surfaces 53 and 54. The top surface 74 is located in such a position as to face the top surface 73 through the central axis CP and is located radially outward from the reentrant surface 22. Each area of the top surfaces 73 and 74 is greater than each area of the top surfaces 71 and 72.

As illustrated in FIGS. 4 and 5, the piston 1 is formed therewithin with a communication passage CHP and a cooling channel CH for allowing oil flowing therethrough. The cooling channel CH is formed around the cavity. The oil flows through the cooling channel CH, which cools the piston 1.

Figure 6A:
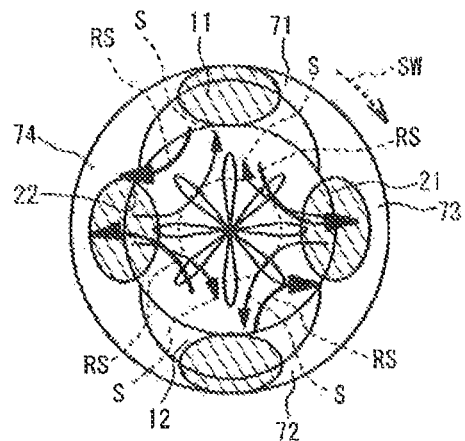
FIGS. 6A to 6C are schematic views of an upper surface of the piston.
Figure 6B:
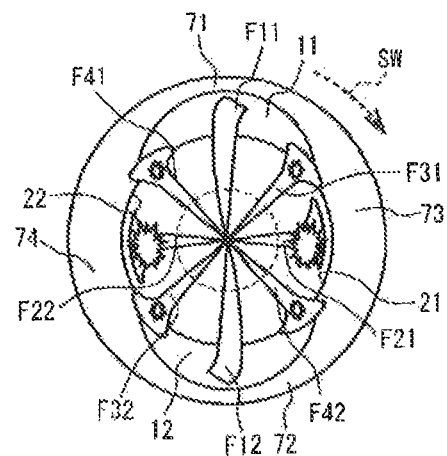
Figure 6C:
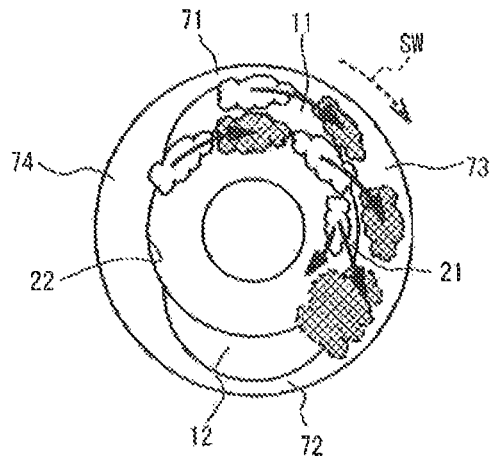

FIGS. 6A to 6C are schematic views of the upper surface of the piston 1. As illustrated in FIG. 6A, within the combustion chamber, the swirl flow is generated in the clockwise direction. In the vicinity of the top surfaces 73 and 74 each having a large area, the squish flow and the reverse squish flow are generated and are stronger than those near the top surfaces 71 and 72. Thus, the flow of air near the reentrant surfaces 21 and 22 is larger, whereas the flow of air near the center of the open surface 11 and the flow of air near the center of the open surface 12 are small. Here, the center of the open surface 11 means the center of the length of the open surface 11 in the circumferential direction when viewed in the central axis CP direction. The same is true for the center of the open surface 12.

As illustrated in FIG. 6B, the nozzle N injects eight fuel sprays at equal angular intervals (45 degree intervals). Fuel sprays F11, F12, F21, and F22 are injected respectively toward the open surfaces 11 and 12 and the reentrant surfaces 21 and 22. A fuel spray F31 is injected between the fuel sprays F11 and F21, and a fuel spray F41 is injected between the fuel sprays F12 and F22. A fuel spray F42 is injected between the fuel sprays F21 and F12. The fuel spray F31 is injected at a position on the open surface 11 between the center of the open surface 11 and the reentrant surface 21. The fuel spray F41 is injected at a position on the open surface 11 between the center of the open surface 11 and the reentrant surface 22. The fuel spray F32 is injected at a position on the open surface 12 between the center of the open surface 12 and the reentrant surface 22. The fuel spray F42 is injected at a position on the open surface 12 between the center of the open surface 12 and the reentrant surface 21. The fuel sprays F11 and F12 are examples of first fuel sprays. The fuel sprays F21 and F22 are examples of second fuel sprays. The fuel sprays F31 and F32 are examples of third fuel sprays. The fuel sprays F41 and F42 are examples of fourth fuel sprays.

These fuel sprays are injected simultaneously. Thus, at first, the fuel sprays F21 and F22 respectively collide with the reentrant surfaces 21 and 22. Next, the fuel sprays F31 and F41 and the fuel sprays F32 and F42 respectively collide with the open surfaces 11 and 12. Finally, the fuel sprays F11 and F12 respectively collide with the open surfaces 11 and 12. In this way, the fuel sprays collide with the cavity of the piston 1, so that fuel and air are agitated to ignite fuel.

Thus, at first, the fuel sprays F21 and F22 are ignited. Next, the fuel sprays F31, F32, F41, and F42 are ignited. Finally, the fuel sprays F11 and F12 are ignited. Therefore, the fuel sprays F21 and F22 correspond to pilot injection. The fuel sprays F31, F32, F41, and F42 correspond to main injection. The fuel sprays F11 and F12 correspond to after injection.

Since the air flow is large near the reentrant surfaces 21 and 22 as described above, the fuel sprays F21 and F22 are ignited early to be burned fast by the strong air flow near the reentrant surfaces 21 and 22. In contrast, since the air flow is small near the center of the open surface 11 and near the center of the open surface 12, the fuel sprays F11 and F12 are ignited late to be burned slowly by the weak air flow near the center of the open surface 11 and near the center of the open surface 12. The air flow at the position on the open surface 11 to which the fuel spray F31 is injected is weaker than the air flow near the reentrant surface 21, and is stronger than the air flow near the center of the open surface 11. The same is true for strengths of air flows at the positions to which the fuel sprays F32, F41, and F42 are injected. For this reason, after the fuel spray F21 is ignited and before the fuel spray F11 is ignited, the fuel spray F31 is ignited to be burned by the air flow having moderate strength. The same is true for the fuel sprays F32, F41, and F42.

This makes it possible to ensure a difference in combustion speed among the fuel sprays. Thus, as compared with a case where plural fuel sprays are ignited simultaneously and the difference in combustion speed is small, it is possible to suppress a peak value of a heat quantity and to suppress a combustion temperature. It is thus possible to reduce NOx and to suppress combustion noise. In this way, the internal combustion engine according to the embodiment has improved performance.

In addition, as illustrated in FIG. 6C, the fuel sprays F21 and F22 injected to the reentrant surfaces 21 and 22 are broadly diffused by the strong air flow. In contrast, the fuel sprays F11 and F12 injected to the open surfaces 11 and 12 are not relatively diffused. This can partially reduce an equivalent ratio and can suppress smoke. Also, the plural fuel sprays are positionally displaced in the radial direction and are diffused, after colliding with the cavity. Thus, fuel is uniformly diffused throughout the combustion chamber. The cavity of the piston 1 is formed into such a shape, thereby controlling the ignition timing of fuel and ensuring the difference in combustion speed.

Also, with the cavity shape of the piston 1, single injection can form the fuel sprays corresponding to the pilot injection, the main injection, and the after injection. Here, to perform the pilot injection, the main injection, and the after injection during a single stroke, a nozzle with good responsiveness of switching of injection has to be prepared. Further, since the responsiveness of the switching of injection is limited, the time intervals among the pilot injection, the main injection, and the after injection cannot be shorter than a predetermined time. In this embodiment, it is possible to ensure a desired combustion state without being limited by such a nozzle.

Figure 7A:
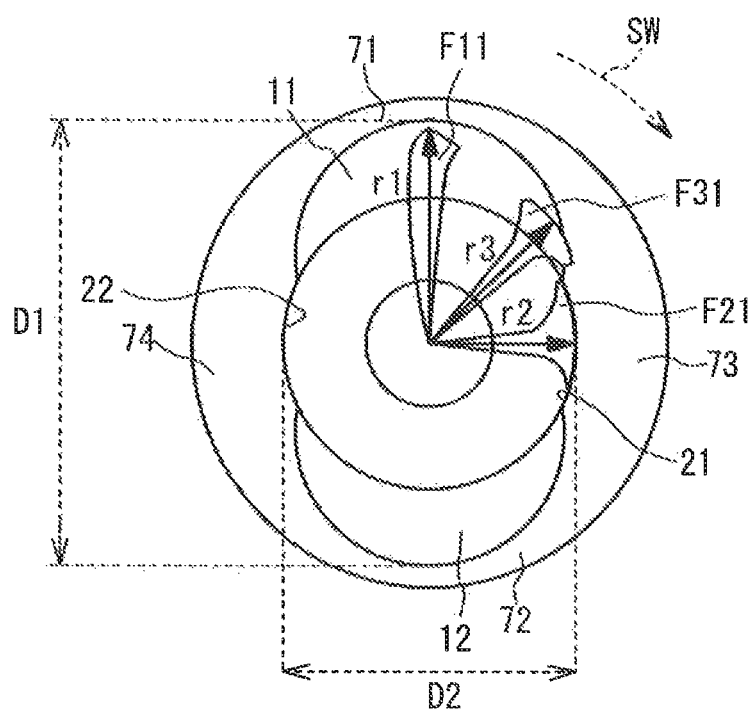
FIGS. 7A and 7B are explanatory views of a shape of a cavity of the piston.
Figure 7B:
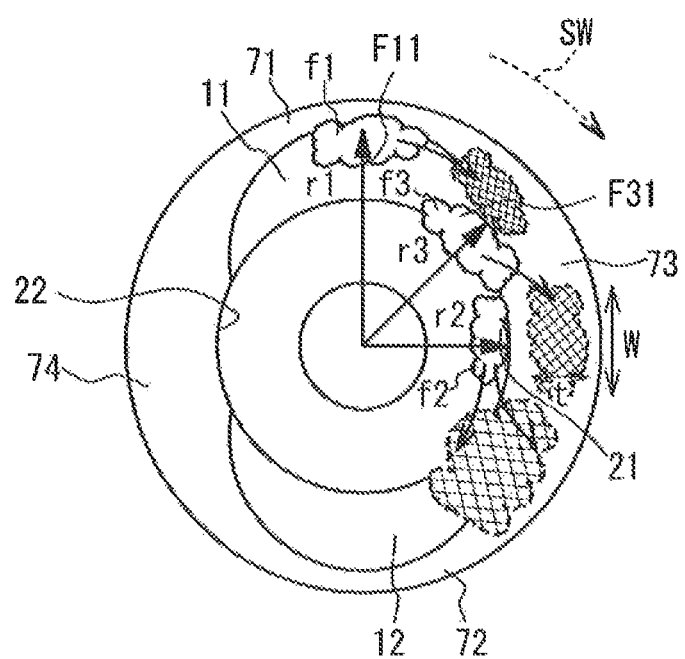
Figure 8A:
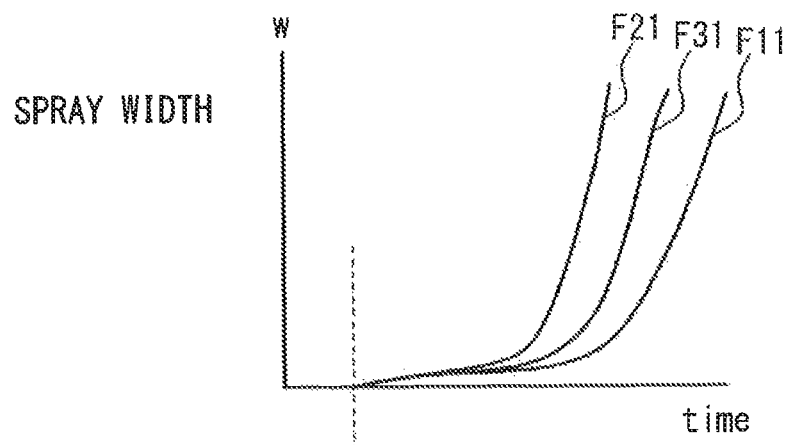
FIGS. 8A to 8C are graphs illustrating change in each fuel spray with time.
Figure 8B:
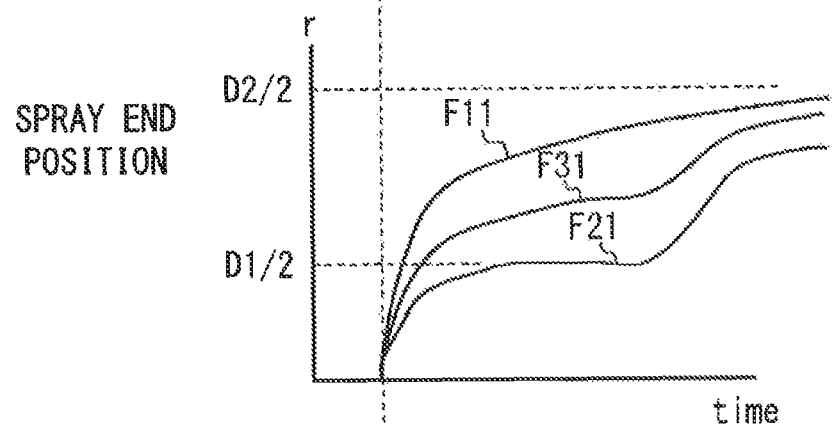
Figure 8C:
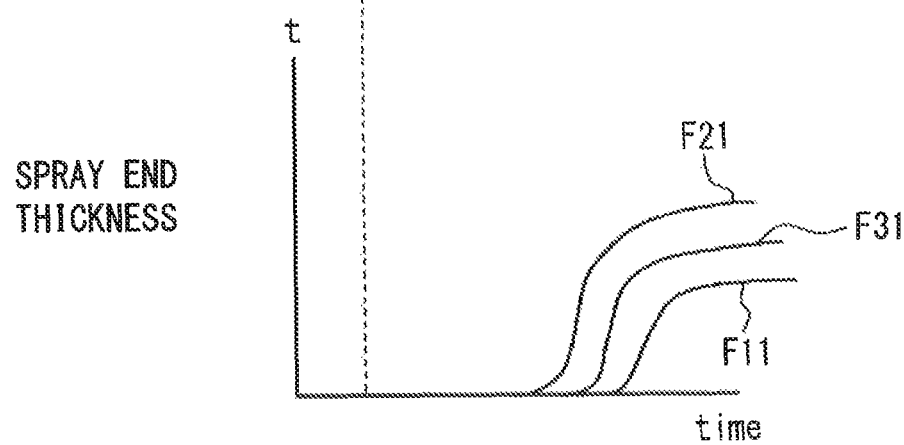

FIGS. 7A and 7B are explanatory views of the cavity shape of the piston 1. FIG. 7B illustrates the flow of the sprays colliding with the inner surface of the cavity. FIGS. 8A to 8C are graphs illustrating change in each fuel spray with time. FIG. 8A illustrates a width of each fuel spray. After the fuel spray F11 and the like are injected and collide with the inner surface of the cavity, they are diffused, and then the widths increase. FIG. 8B illustrates each position of an end of each fuel spray after injection. FIG. 8C illustrates a thickness of the end of each fuel spray.

D1 stands for the maximum distance between the open surfaces 11 and 12 in the direction perpendicular to the central axis CP D2 stands for the maximum distance between the reentrant surfaces 21 and 22 in the direction perpendicular to the central axis CP. r1, r2, and r3 respectively stand for lengths of the fuel sprays F11, F21, and F31. To prevent ends of the fuel sprays F11, F21, and F31 from overlapping one another in the radial direction of the piston 1, r1−t>r3 and r3−t>r2 have to be satisfied. That is, when positions where the fuel sprays F11, F21, and F31 collide are too close to one another in the radial direction of the piston 1, the ends of the sprays might overlap one another.

Further, in order that each spray collides with the cavity of the piston 1 at first, r2=D2/2 and r1=D1/2 have to be satisfied. On the basis of the above expression, D1/2−t>D2/2 can be obtained. When a variable C1 pertaining to time change satisfies C1<D1/D2, it is desired that 2>D1/D2>1.05 is satisfied.

In addition, to prevent the fuel sprays from overlapping one another in the circumferential direction of the piston 1, when A (rad) stands for an equal angular interval between adjacent fuel sprays, A (rad)×r1>A (rad)×r3>A (rad)×r2>w2/2 has to be satisfied. Here, w2 stands for a width of the spray, after the fuel spray F21 injected to the reentrant surface 21 closest to the nozzle N collides therewith and is diffused. r2=D2/2 is satisfied. Thus, on the basis of the above expressions, it is desired that A (rad)×D2/2 (mm)>5 is satisfied.

Further, as illustrated in FIG. 7B, the collision of the fuel spray F11 with the open surface 11 forms a spray f1, and then the swirl flow causes the spray f1 to flow in the direction of the circumference with radius r1. The collision of the fuel spray F21 with the reentrant surface 21 forms a spray f2, and then the swirl flow and the relatively strong squish flow cause the spray f2 to be widely diffused in the circumferential direction and in the radial direction. The collision of the fuel spray F31 with the inner surface of the cavity forms a spray f3, and then the spray f3 receives the squish flow weaker than the squish flow which the spray f2 receives.

These sprays f1 to f3 are diffused at the downstream of the swirl flow, so that fuel and air are uniformly mixed in the combustion chamber. The spray f1 tends to be introduced toward the squish area due to an inclination angle of the open surface 11 and the like. Thus, an air utilization rate is improved during which the fuel sprays are introduced from the open surface 11 toward the squish area. This makes it possible to reduce smoke and to improve thermal efficiency. Also, as compared with the spray f1, the spray f2 is seldom introduced to the squish area, and the spray f2 is strongly flowed by the strong squish flow in the compression stroke and by the reverse squish flow in the expansion stroke, which improves an air utilization rate. This also makes it possible to reduce smoke and to improve thermal efficiency.

Figure 9:
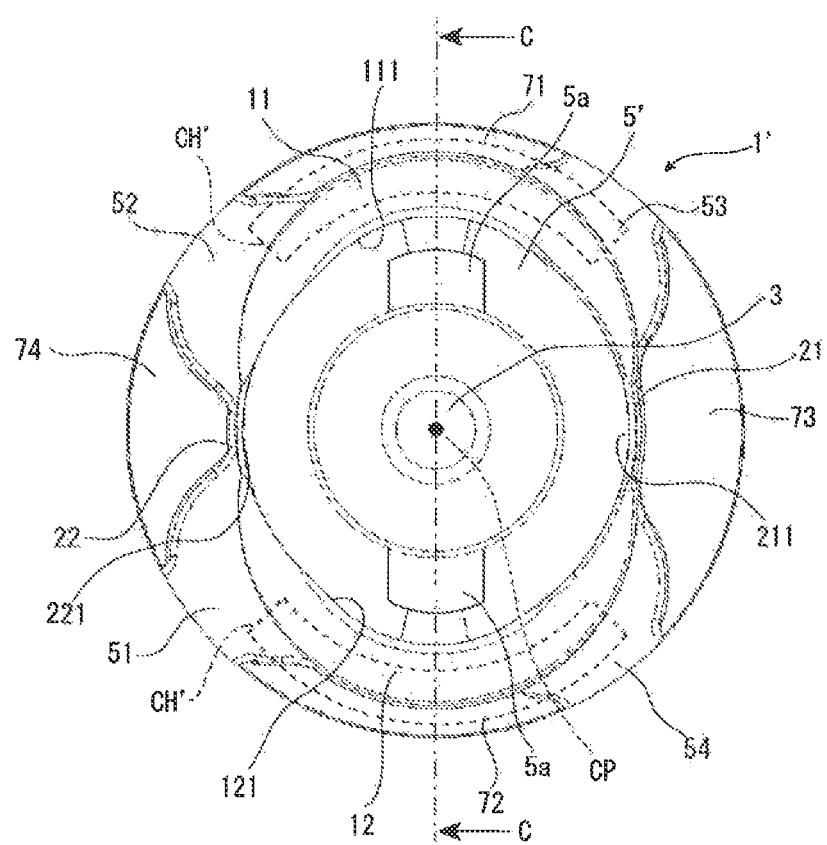
FIG. 9 is a top view of a piston according to a variation.
Figure 10:
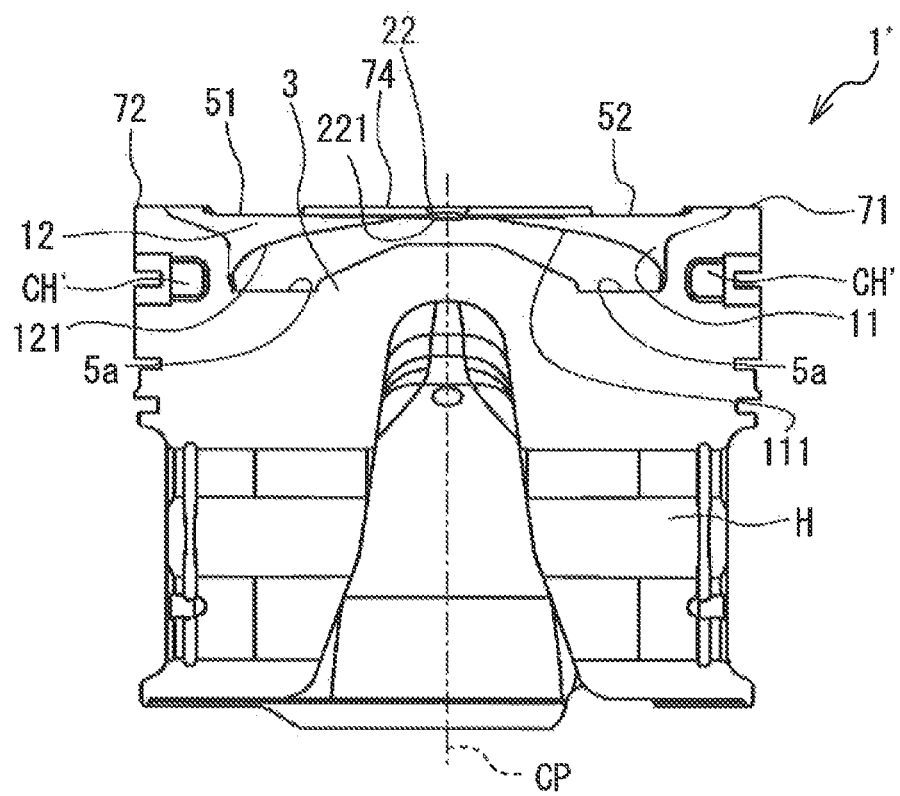
FIG. 10 is a cross-sectional view taken along C-C line of FIG. 9.

Next, a piston according to a variation will be described. In addition, components that are the same as or similar to those will be denoted by the same or similar reference numerals, and a detailed description of such components will be omitted. FIG. 9 is a top view of a piston 1' according to a variation. FIG. 10 is a cross-sectional view taken along C-C line of FIG. 9. A bottom surface 5' is provided with two raised portions 5a partially raised. The raised portion 5a is located higher than the other portions of the bottom surface 5'. The two raised portions 5a faces the open surfaces 11 and 12 in the top view. The raised portion 5a is an example of a raised bottom surface portion.

Since the fuel sprays F11 and F12 injected to the open surfaces 11 and 12 tend to be introduced to the squish area in the piston 1 described above, it is difficult to use air, for combustion, near the bottom surface 5 in the vicinity of the open surfaces 11 and 12. In the piston 1' according to the variation, the raised portions 5a are partially raised from the bottom surface 5', which reduces air not used for combustion, thereby reducing smoke.

Also, two cooling channels CH' are respectively formed along the open surfaces 11 and 12 so as to overlap the open surfaces 11 and 12 in the top view, and are formed away from the reentrant surfaces 21 and 22. Specifically, the cooling channels CH' are not formed radially outward from the reentrant surface 21 or 22. This makes it possible to cool the open surfaces 11 and 12 and to ensure temperatures of the reentrant surfaces 21 and 22. This can facilitate the ignition of the fuel sprays F21 and F22 respectively injected to the reentrant surfaces 21 and 22, thereby increasing a difference between the ignition timing of the fuel sprays F21 and F22 and the ignition timing of the fuel sprays F11 and F12 respectively injected to the open surfaces 11 and 12.

Additionally, the cooling channel may be partially located radially outward from a portion of the reentrant surface 21 in the top view. That is, a region where a cooling channel is not formed has only to be at the radially outer side from the reentrant surface 21. A portion of the cooling channel located radially outward from the open surface 11 may be longer than a portion of the cooling channel located radially outward from the reentrant surface 21. Also, the cooling channel may extend to reach the radially outer side from any one of the two reentrant surfaces 21 and 22.

Figure 11A:
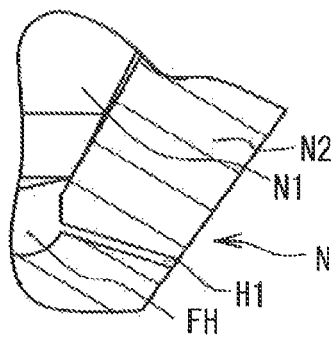
FIGS. 11A to 11F are explanatory views of injection holes of nozzles.
Figure 11B:
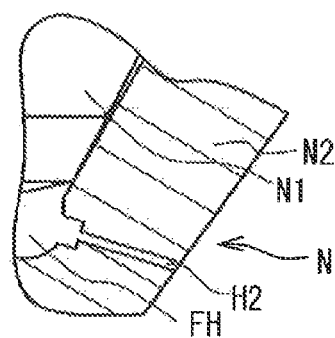

FIGS. 11A and 11B explanatory views of the nozzle N. FIGS. 11A and 11B illustrate a cross-section of the distal end portion of the nozzle N. The nozzle N includes: a body N2 formed with plural injection holes; and a needle N1 moving upward and downward within the body N2. The needle N1 moves upward from a seat surface on the inside of the body N2, so fuel flows to a sack chamber FH from a clearance between the body N2 and the needle N1. The fuel having been flowed into the sack chamber FH is injected from an injection hole H1 of the needle N1. The injection hole H1 injects the fuel spray F11. An injection hole H2 injects the fuel spray F21.

In the injection hole H2, a diameter at the upstream side is large, and a diameter from the middle to the downstream side is small. Specifically, the diameter at the upstream side of the injection hole H2 is larger than the diameter of the injection hole H1, and the diameter at the downstream side of the injection hole H2 is the same as the diameter of the injection hole H1. Therefore, a length of a portion, with the small diameter, of the injection hole H2 is substantially the length of the injection hole H2. Thus, the length of the injection hole H2 is substantially shorter than the injection hole H1. Therefore, the injection distance of the fuel spray F11 injected from the injection hole H1 is greater than the injection distance of the fuel spray F21 injected from the injection hole H2. In this way, the injection hole H1 for injecting fuel to the open surface 11 away from the nozzle N may be extended, and the injection hole H2 for injecting fuel to the reentrant surface 21 close to the nozzle N may be shortened.

Also, a length of an injection hole for injecting the fuel spray F31 may be the same as any one of the lengths of the injection holes H1 and H2, or may be smaller than the injection hole H1 and greater than the injection hole H2. Further, an injection hole for injecting the fuel spray F12 is the same as the injection hole H1, and an injection hole for injecting the fuel spray F22 is the same as the injection hole H2. Furthermore, the plural injection holes of the nozzle N may be the same in all of diameter, length, and shape.

Figure 11C:
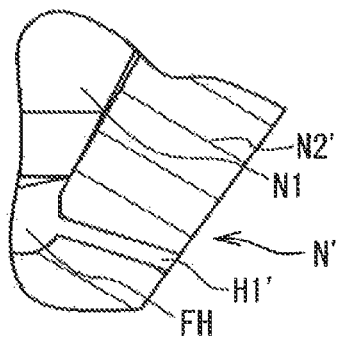
Figure 11D:
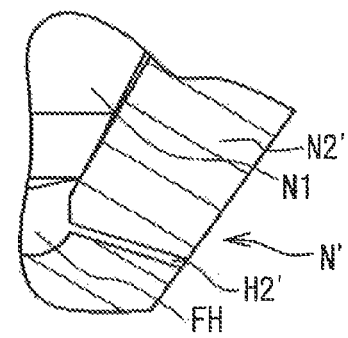

FIGS. 11C and 11D are explanatory views of a nozzle N' according to a variation. Although injection holes H1' and H2' are the same in length, a diameter of the injection hole H1' is larger than a diameter of the injection hole H2'. Thus, an injection distance of the fuel spray F11 injected from the injection hole H1' is greater than an injection distance of the fuel spray F21 injected from the injection hole H2'. In addition, a diameter of an injection hole for injecting the fuel spray F31 may be the same as any one of the diameters of the injection holes H1' and H2', or may be larger the diameter of the injection hole H1 and smaller than the diameter of the injection hole H2. Further, an injection hole for injecting the fuel spray F12 is the same as the injection hole H1', and an injection hole for injecting the fuel spray F22 is the same as the injection hole H2'.

Figure 11E:
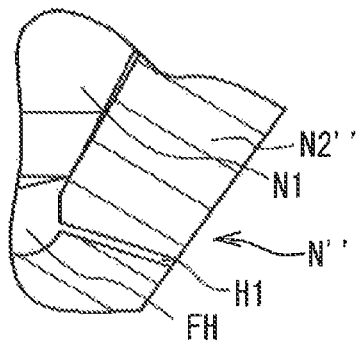
Figure 11F:
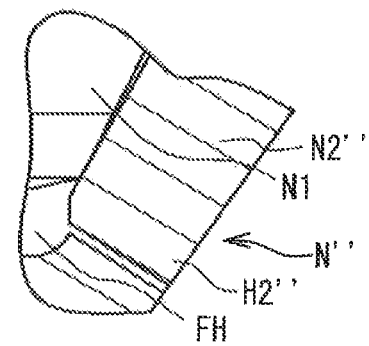

FIGS. 11E and 11F are explanatory views of a nozzle N" according to a variation. Although the injection holes H1 and H2" are the same in diameter, angles with respect to the horizontal direction are different. The injection hole H2" extends downward, as compared with the injection hole H1. Thus, a height position of the fuel spray F11 injected from the injection hole H1 is higher than that of the fuel spray F21 injected from the injection hole H2" in the central axis direction. As a result, the fuel spray F11 injected from the injection hole H1 can be introduced to the squish area side, and the fuel spray F21 injected from the injection hole H2" can be introduced to the bottom surface 5 side of the cavity. Further, an angle of an injection hole for injecting the fuel spray F31 may be the same as the angle of the injection hole H1, or may be between the angles of the injection holes H1 and H2". Furthermore, an injection hole for injecting the fuel spray F12 is the same as the injection hole H1', and an injection hole for injecting the fuel spray F22 is the same as the injection hole H2". The injection holes for respectively injecting the fuel sprays F11 and F21 may be the same in diameter and angle and different in height position.

Figure 12:
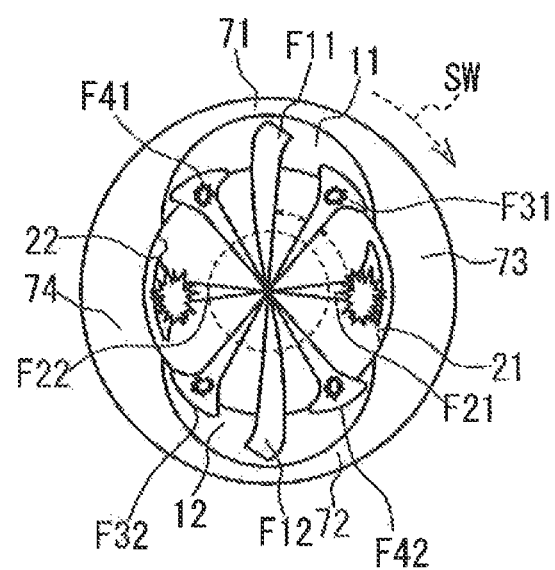
FIG. 12 is an explanatory view of a case where angles between fuel sprays are different.

FIG. 12 is an explanatory view of a case where angles between the fuel sprays are different. As illustrated in FIG. 12, the angular intervals between the fuel sprays may be different. Specifically, the angular interval between the fuel sprays F11 and F31 is smaller than the angle interval between the fuel sprays F21 and F31. Similarly, the angular interval between the fuel sprays F11 and F41 is smaller than the angular interval between the fuel sprays F41 and F22. This can cause a larger amount of fuel to collide with the open surface 11. Likewise, the angular interval between the fuel sprays F12 and F42 and the angular interval between the fuel sprays F12 and F32 is smaller than the angular interval between the fuel sprays F21 and F42 and the angular interval between the fuel sprays F22 and F32. Further, the angular interval between the fuel sprays F11 and F31, the angular interval between the fuel sprays F11 and F41, the angular interval between the fuel sprays F12 and F42, and the angular interval between the fuel spray F12 and F32 may be different from one another, or at least two of these angular intervals may be the same. The angular interval between the fuel sprays depends on an angular interval between the injection holes of the nozzle.

Figure 13A:
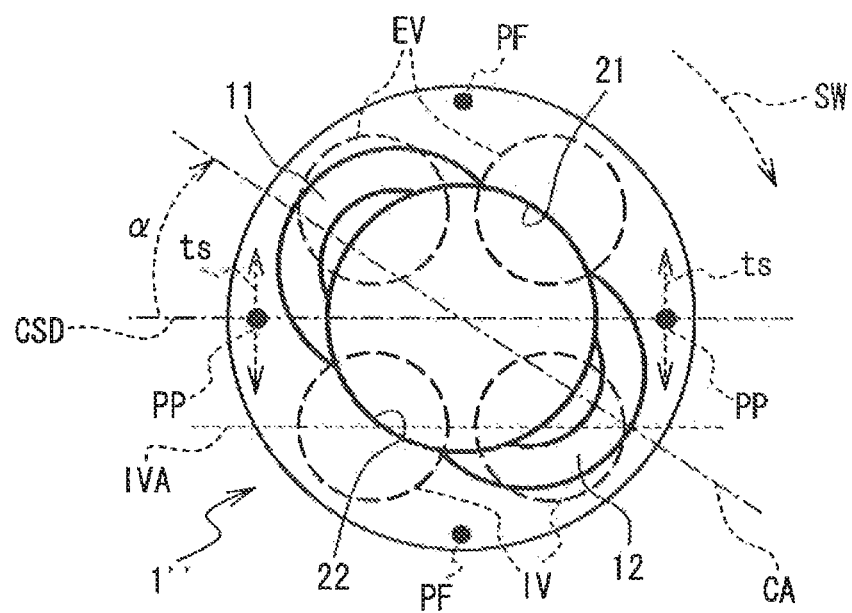
FIGS. 13A and 13B are schematic views of an upper surface of a piston according to a variation.

FIG. 13A is a schematic view of an upper surface of a piston 1" according to a variation. In FIG. 13A, positions of two intake valves IV and two exhaust valves EV are indicated by dotted lines. As illustrated in FIG. 13A, a center line CA being perpendicular to the central axis CP and passing through the centers of the open surfaces 11 and 12 is positionally displaced by an angle α from the direction CSD of the crankshaft to the direction SW of the swirl flow. The angle α is from 0 degrees to less than 90 degrees. The direction CSD of the crankshaft is the same as the direction in which a pin extends for connecting a connecting rod and the piston. Positions PF, located on a straight line perpendicular to the direction CSD of the crankshaft, of both ends of a top surface of the piston 1" receive a large combustion pressure vertically downward. Thus, tensile stresses ts, in the direction of circumference having the substantial center as the pin, act on positions PP, located on the direction CSD of the crankshaft, of both ends of the top surface of the piston 1".

For example, if the direction CSD of the crankshaft is identical to the center line CA passing through the centers of the open surfaces 11 and 12, such tensile stresses might act on small partial areas, of the top surface, located radially outward from the open surfaces 11 and 12, and these areas might be deformed. In the piston 1" according to this variation, the direction CSD of the crankshaft is displaced from the center line CA passing through the centers of the open surfaces 11 and 12. This causes tensile stress to act on relatively large areas. This can suppress the deformation of the piston 1".

Figure 13B:
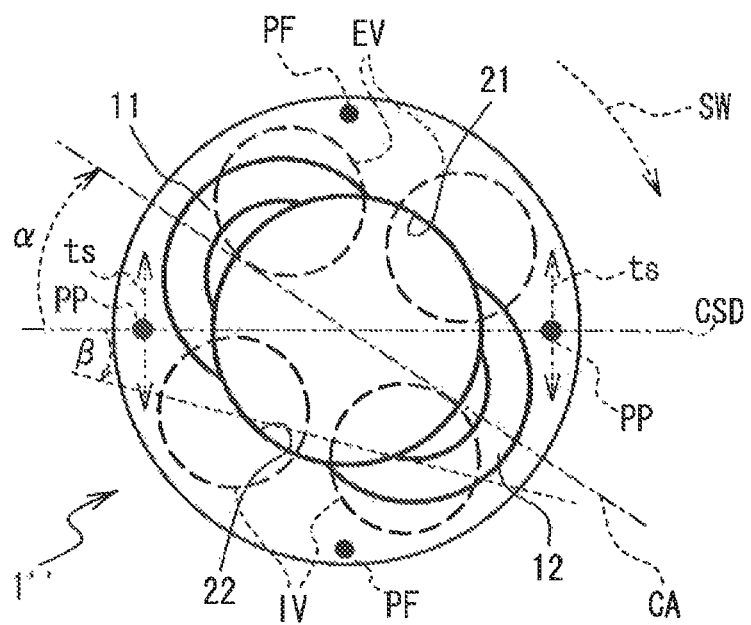

FIG. 13B is an explanatory view of a variation different from FIG. 13A in positions of the intake valves IV and the exhaust valves EV. An intake valve central axis IVC passing through the two intake valves IV is positionally displaced by an angle β from the crankshaft direction CSD to the direction of the swirl flow SW. The angle β is from 0 degrees to less than 90 degrees. This may be configured.

Figure 14:
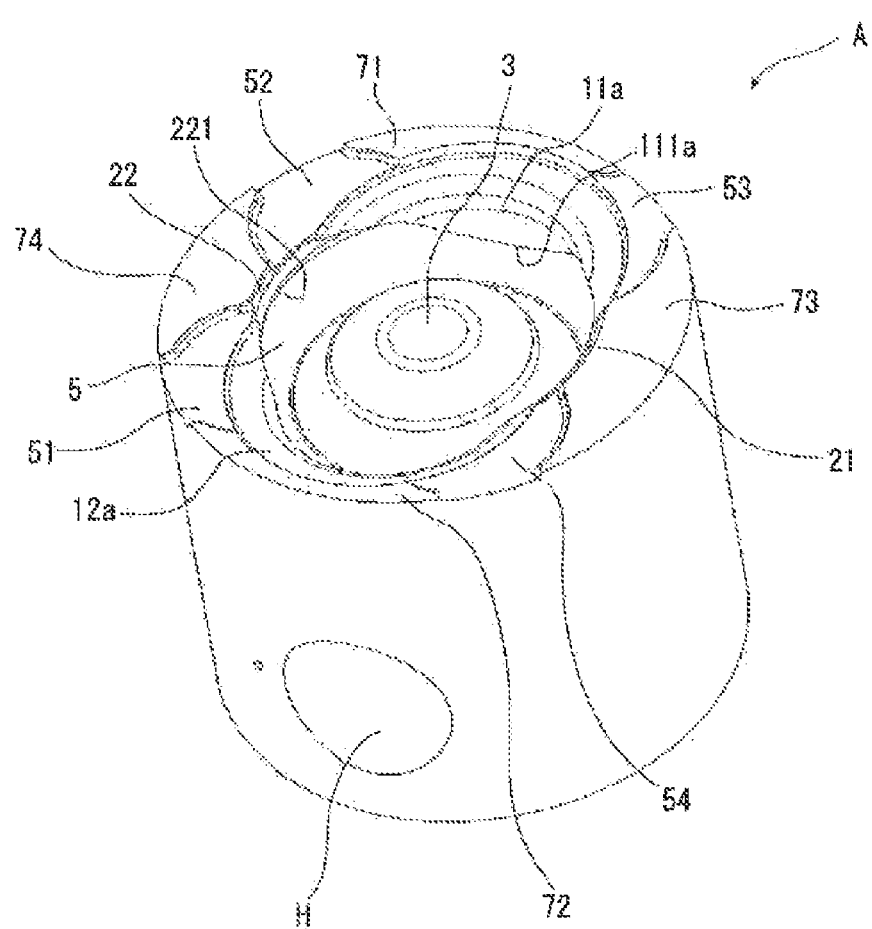
FIG. 14 is a perspective view of a piston according to a variation.
Figure 15:
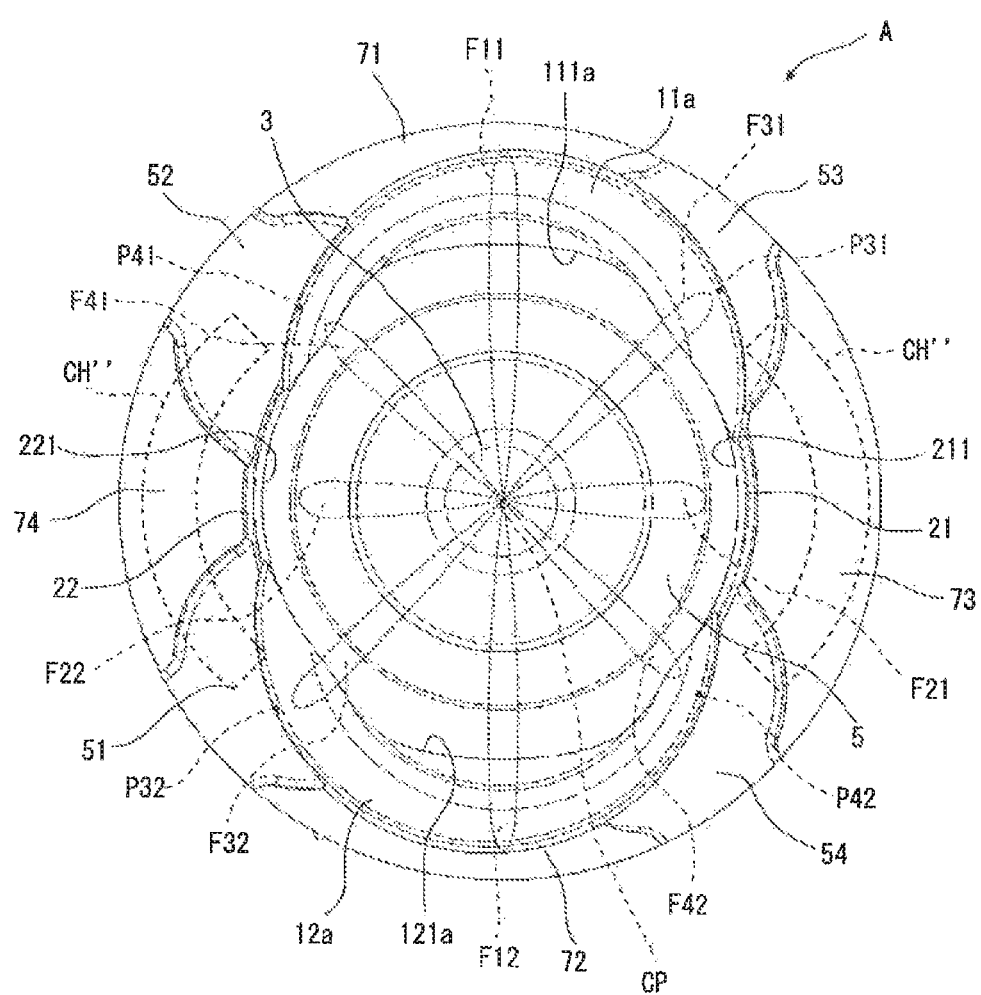
FIG. 15 is a top view of the piston according to the variation.

FIG. 14 is a perspective view of a piston A according to a variation. FIG. 15 is a top view of the piston A according to a variation. FIG. 15 illustrates when eight fuel sprays are injected at equal angular intervals. As illustrated in FIG. 15, a distance to the central axis CP from a point P31 where the direction of the fuel spray F31 intersects an arc-shaped outer circumferential edge portion of an open surface 11a is greater than a distance to the central axis CP from a point P41 where the direction of the fuel spray F41 intersects the arc-shaped outer circumferential edge portion of the open surface 11a. Thus, the timings when the fuel sprays F31 and F41 collide with the open surface 11a can deviate from each other. Also, the timings when the fuel sprays F31 and F41 are ignited can deviate from each other, thereby suppressing the peak of the heat generation.

Likewise, a distance to the central axis CP from a point P32 where the direction of the fuel spray F32 intersects an arc-shaped outer circumferential edge portion of the open surface 12a is greater than a distance to the central axis CP from a point P42 where the direction of the fuel spray F42 intersects the arc-shaped outer circumferential edge portion of the open surface 12a. Thus, the timings when the fuel sprays F32 and F42 are ignited can deviate from each other.

Further, a radial distance of a position where the fuel spray F31 collides with the open surface 11a differs from a radial distance of a position where the fuel spray F41 collides with the open surface 11a. This makes it possible to diffuse sprays to be generated after the fuel sprays F31 and F41 collide with the open surface 11a. Therefore, fuel and air can be uniformly mixed in the cavity. The same is true for the fuel sprays F32 and F42 colliding with the open surface 12a.

Here, the open surface 11a has a substantially spherical shape. When viewed in the central axis CP direction, the central position of a virtual sphere including the open surface 11a is positionally displaced from the central axis of the fuel spray F11. The open surface 11a is machined such that its central position is positionally displaced from the central axis of the fuel spray F11 injected substantially to the center of the open surface 11a. Likewise, the open surface 12a has a spherical shape. When viewed in the central axis CP direction, the central position of a virtual sphere including the open surface 12a is positionally displaced from the central axis of the fuel spray F12. Additionally, the angle intervals between the fuel sprays are the same, but are not limited to this.

Additionally, in the cross-sectional view intersecting the open surfaces 11a and 12a, the inner diameter of the cavity increases toward the upper side. Further, respective ridgelines 111a and 121a of the open surfaces 11a and 12a are located lower than the ridgelines 211 and 221. Furthermore, when the piston A is positioned at the top dead center, the distance from the nozzle to the open surface 11a is greater than the distance from the nozzle to the reentrant surface 21. The same is true for the open surface 12a and the reentrant surface 22.

A cooling channel CH" is formed along the radially outer side from the reentrant surfaces 21 and 22 in the top view, and is provided in a position that does not overlap the open surfaces 11a and 12a. Here, fuel collides with the reentrant surfaces 21 and 22 more strongly than with the open surfaces 11a and 12a, so that there is a possibility that thermal loads on the reentrant surfaces 21 and 22 are greater. The provision of the cooling channel CH" in the reentrant surfaces 21 and 22 cools the reentrant surfaces 21 and 22 side, and it is thus possible to reduce the thermal loads.

Also, for example, a cooling channel may be provided so as to be located radially outward from the reentrant surface 21 and to partially overlap the open surface 11a in the top view. Specifically, the cooling channel may be provided away from the vicinity of the center of the open surface 11a and the vicinity to which the fuel spray F11 is injected. In the cooling channel, a length of a portion located radially outward from the open surface 11a may be shorter than a length of a portion located radially outward from the reentrant surface 21 in the top view. Also, the cooling channel may extend to reach the radially outer side from one of the two open surfaces 11a and 12a.

Figure 16:
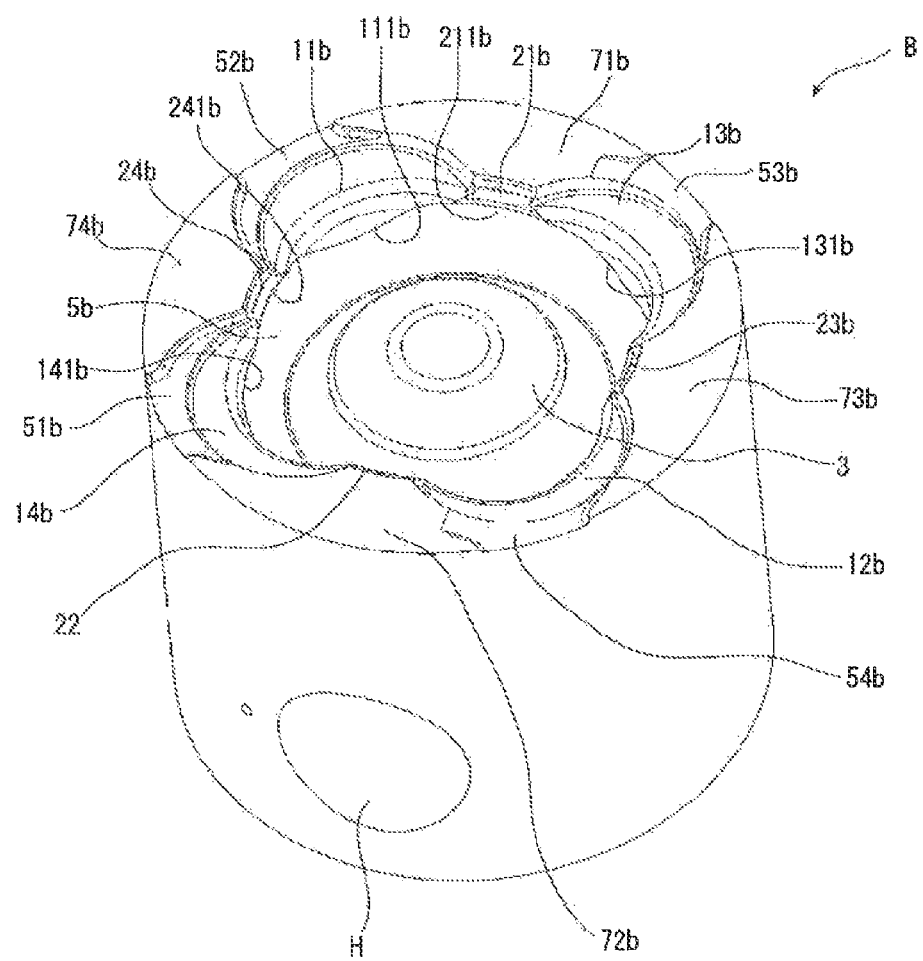
FIG. 16 is a perspective view of a piston according to a variation.
Figure 17:
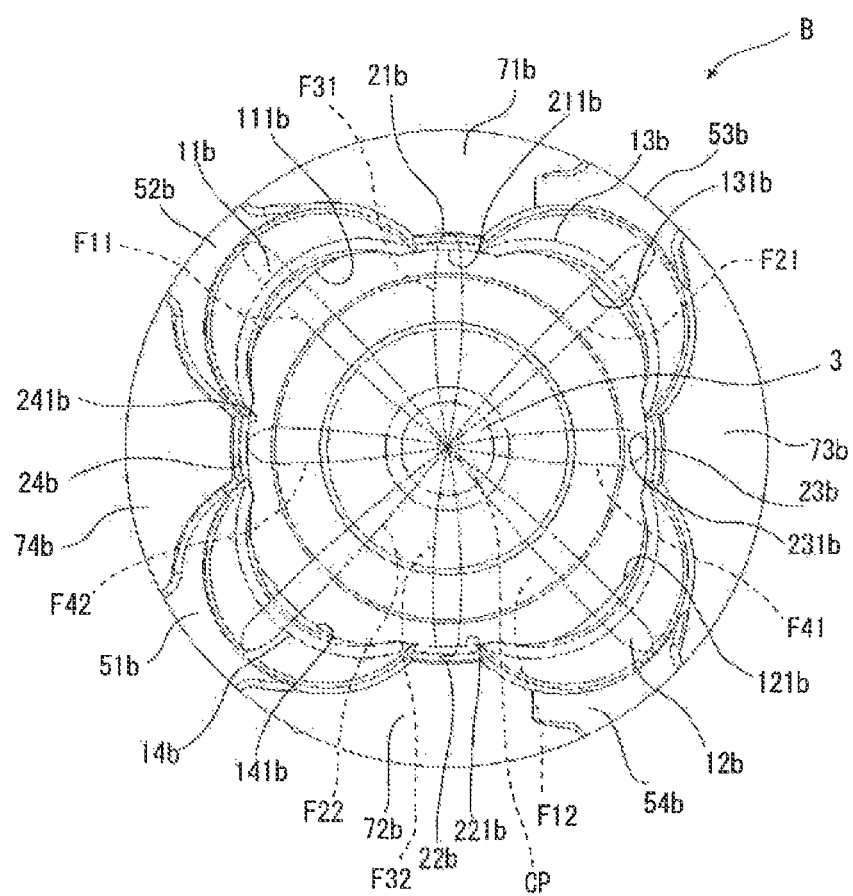
FIG. 17 is a top view of the piston according to the variation.

FIG. 16 is a perspective view of a piston B. FIG. 17 is a top view of the piston B. In the piston B, four open surfaces 11b, 12b, 13b, and 14b are formed in the circumferential direction at substantially 90 degree intervals. Moreover, four reentrant surfaces 21b, 22b, 23b, and 24b are formed in the circumferential direction at 90 degree intervals. The reentrant surface 21b is located between the open surfaces 11b and 13b in the circumferential direction. The reentrant surfaces and the open surfaces are formed so as to be alternately arranged in the circumferential direction. The open surfaces 11b and 12b face each other, and the open surfaces 13b and 14b face each other. The reentrant surfaces 21b and 22b face each other, and the reentrant surfaces 23b and 24b face each other.

The eight fuel sprays F11, F12, F21, F22, F31, F32, F41, and F42 from the nozzle are respectively injected to the open surface 11b, 12b, 13b, and 14b, and the reentrant surfaces 21b, 22b, 23b and 24b. Valve recess surfaces 51b, 52b, 53b, and 54b are located radially outward from the open surfaces 14b, 11b, 13b, and 12b, respectively.

The valve recess surfaces 51b, 52b, 53b, and 54b are formed at positions mostly overlapping the open surfaces 14b, 11b, 13b, and 12b, respectively. In other words, the open surfaces 14b, 11b, 13b, and 12b each serves as the valve recess surface. This suppresses the area of the valve recess surfaces seldom contributing to the combustion because they are shallow. Thus, as compared with a case where an open surface and a valve recess surface are formed away from each other, it is possible to secure a volume of the piston B and to reduce the size by reducing the waste volume which does not contribute to the combustion in the combustion chamber, which can secure a compression ratio.

As illustrated in FIGS. 16 and 17, when viewed in the central axis CP direction, the direction in which the open surfaces 11b and 12b facing each other are arranged is positionally displaced from the direction in which the bore H extends, that is, the direction in which the crankshaft extends. Likewise, the direction in which the open surfaces 13b and 14b are arranged is positionally displaced from the direction in which the crankshaft extends. Thus, relatively large combustion pressures act on top surfaces 74b and 73b, and tensile stresses act on top surfaces 71b and 72b. Here, since the top surfaces 71b and 72b are respectively located radially outward from the reentrant surfaces 21b and 22b, the top surfaces 71b and 72b have a relatively large area. Therefore, even when the tensile stresses act on the top surfaces 71b and 72b, the deformation of the piston B is suppressed.

Additionally, each of ridgelines 111b, 121b, 131b, and 141b is located lower than each of ridgelines 211b, 221b, 231b, and 241b. Also, when the piston A is positioned at the top dead center, a distance from the nozzle to the open surface 11b is greater than a distance from the nozzle to the reentrant surface 21b. The same is true for the open surfaces 12b, 13b, and 14b, and the reentrant surfaces 22b, 23b, and 24b.

Figure 18:
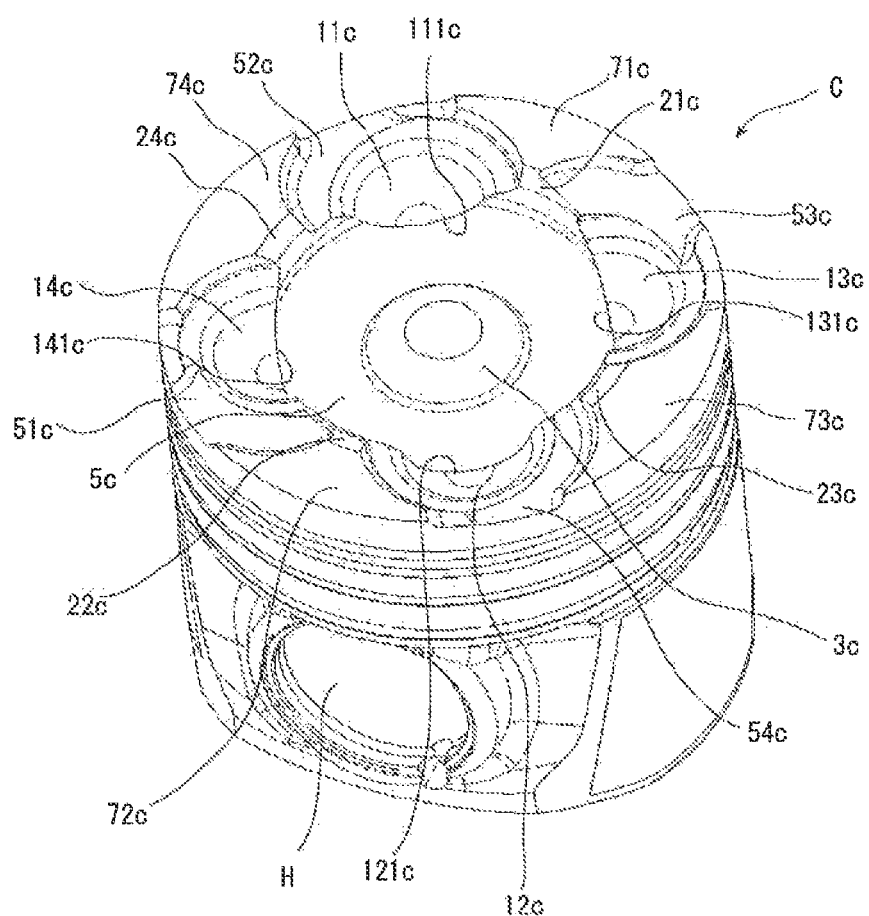
FIG. 18 is a perspective view of a piston according to a variation.
Figure 19:
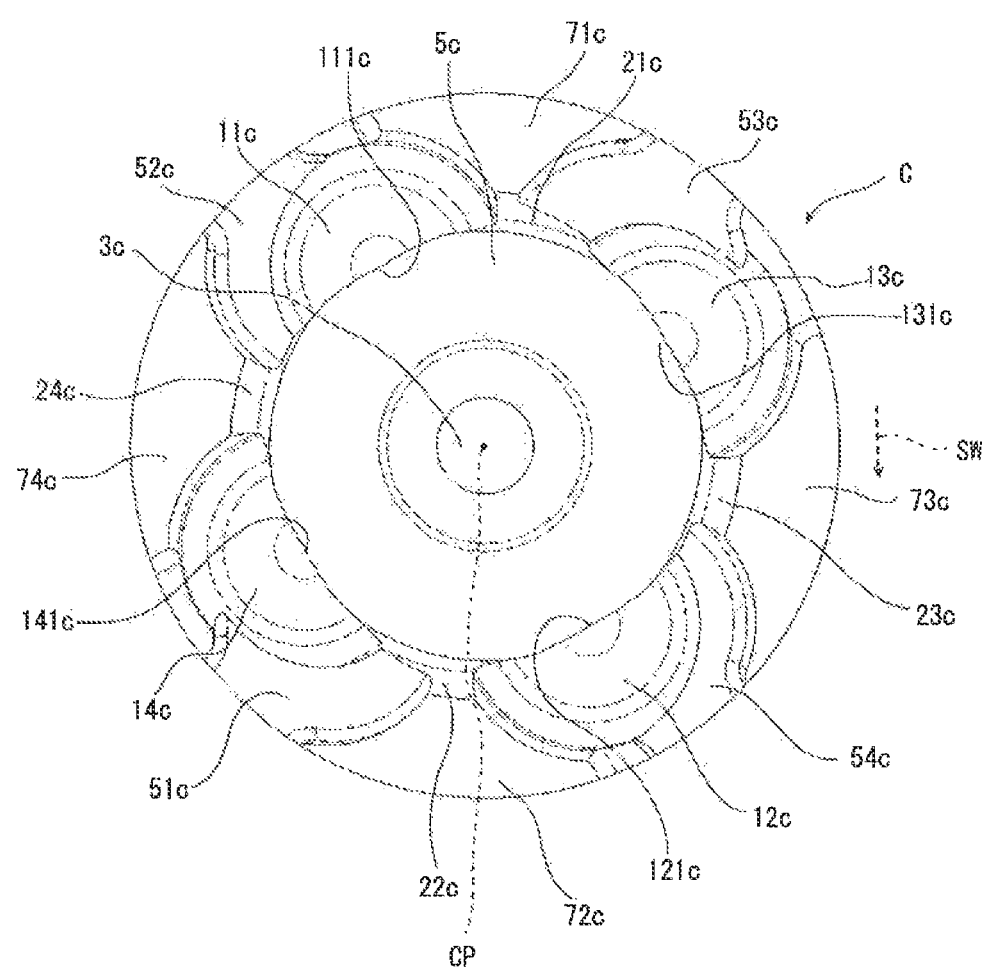
FIG. 19 is a top view of the piston according to the variation.

FIG. 18 is a perspective view of a piston C. FIG. 19 is a top view of the piston C. An open surface 11c is displaced from a valve recess surface 52c in the direction SW of the swirl flow. Open surfaces 12c to 14c also are respectively displaced from valve recess surfaces 54c, 53c, and 51c in the direction SW. Here, a top surface 74c, the valve recess surface 52c, and the open surface 11c are arranged in order of height. Also, the top surface 74c, the valve recess surface 52c, and the open surface 11c are continuous in this order in the direction SW. The same is true for a top surface 71c, a valve recess surface 53c, and an open surface 13c. The same is true for a top surface 73c, a valve recess surface 54c, and an open surface 12c. The same is true for a top surface 72c, the valve recess surface 51c, and an open surface 14c.

Thus, at the beginning of the opening of the intake valves in the initial stage of the intake stroke, air flowing into the cylinder is brought into contact with the top surface 74c, and then is guided from the top surface 74c through the valve recess surface 52c to the open surface 11c. Thus, the air introduced into the cylinder tends to be guided in the direction SW of the swirl flow by the top surface 74c, the valve recess surface 51c, and the open surface 11c that are gradually deeper in the direction SW of the swirl flow. This makes it possible to strengthen the swirl flow.

Further, if the direction of the swirl flow is reverse in the piston C, for example, the fuel spray injected to the open surface 11c tends to be guided to the open surface 11c, the valve recess surface 52c, and the top surface 74c that are arranged in order of shallowness in the direction of the swirl flow. It is thus possible to flow fuel smoothly in the direction of the swirl flow and to agitate fuel.

The surface 21c to 24c extend vertically upward from the bottom surface 5, and extends radially outward from the middle. The maximum radius of the bottom surface 5c from the central axis CP is substantially the same as a distance from the central axis CP to the vertical plane of the surface 21c, but is not limited to this. The same is true for the surfaces 22c to 24c.

Moreover, a raised portion 3c is formed lower than the raised portion 3 of the other piston. In addition, when the piston C is positioned at the top dead center, a distance from the nozzle to the open surface 11c is greater than a distance from the nozzle to the surface 21c. The same is true for the open surfaces 12c to 14c and the surfaces 22c to 24c.

Figure 20:
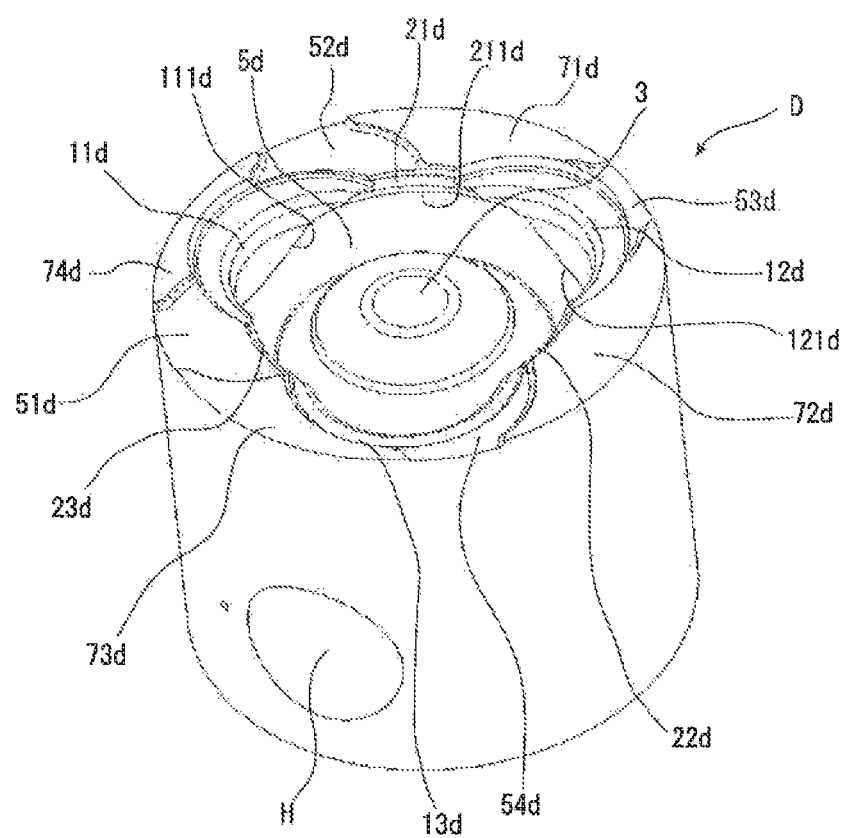
FIG. 20 is a perspective view of a piston according to a variation.
Figure 21:
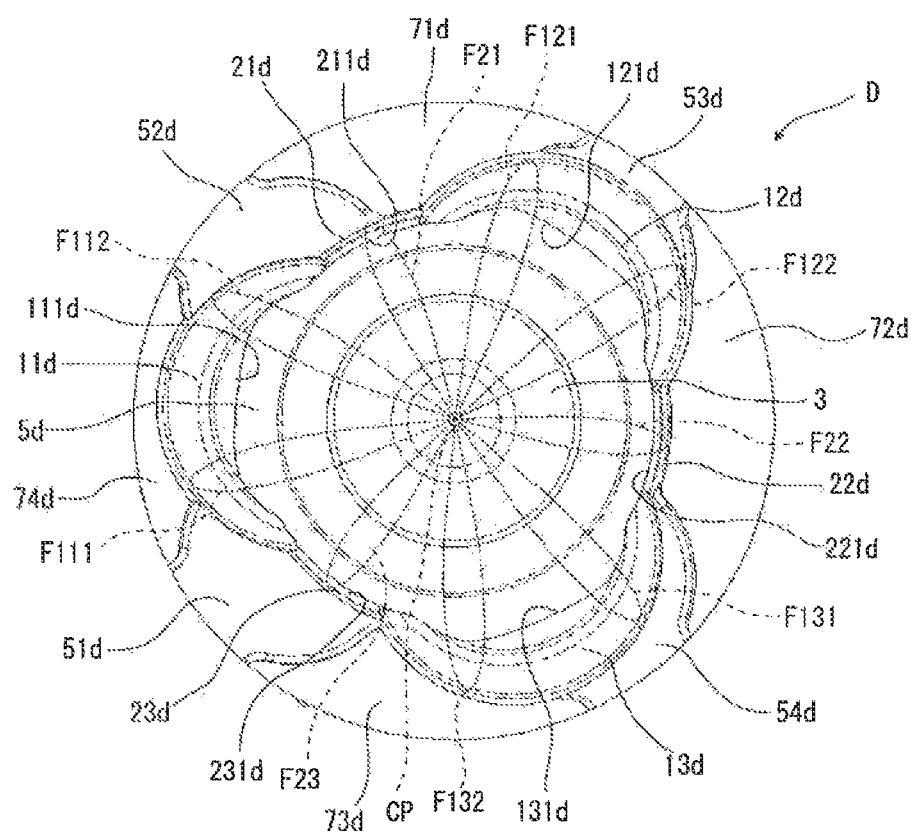
FIG. 21 is a top view of the piston according to the variation.

FIG. 20 is a perspective view of the piston D. FIG. 21 is a top view of the piston D. In the piston D, three open surfaces 11d, 12d, and 13d are provided at approximately 120 degree intervals in the circumferential direction, and three reentrant surfaces 21d, 22d, and 23d are provided at approximately 120 degree intervals in the circumferential direction. Also, these are not limited to be provided at equal intervals. Two fuel sprays F111 and F112 are injected to the open surface 11d. Similarly, two fuel sprays F121 and F122 are injected to the open surface 12d, and two fuel sprays F131 and F132 are injected to the open surface 13d. The fuel sprays F21, F22, and F23 are respectively injected to the reentrant surfaces 21d, 22d, and 23d. Therefore, the number of the injection holes of the nozzle employed in the piston D is nine. In this way, the number of the fuel sprays injected to each of the open surfaces 11d, 12d, and 13d may be larger than that of the fuel sprays injected to each of the reentrant surfaces 21d, 22d, and 23d.

Further, the strong squish flow S is generated in the vicinity of the center of the top surface 72d, in the vicinity of the center of the whole of the top surface 73d and a valve recess surface 51d, and in the vicinity of the center of the whole of a top surface 71d and the valve recess surface 52d. Therefore, it is possible to promote diffusion of fuel and air, thereby reducing the smoke.

Each of ridgelines 111d, 121d, and 131d is located lower than each of ridgelines 211d, 221d, and 231d. Further, when the piston D is positioned at the top dead center, a distance from the nozzle to the open surface 11d is greater than a distance from the nozzle to the reentrant surface 21d. The same is true for the open surfaces 12d, 13d, and 14d, and the reentrant surfaces 22d, 23d, and 24d.

While the exemplary embodiments of the present invention have been illustrated in detail, the present invention is not limited to the above-mentioned embodiments, and other embodiments, variations and variations may be made without departing from the scope of the present invention.

The invention also includes a configuration in which a portion of an example of plurality examples described above is employed in the other example.

The number of the fuel sprays simultaneously injected from the nozzle is not limited to the number described in the above examples.

Plural open surfaces provided in a single piston may be different from each other in at least one of shape and size. Plural reentrant surfaces provided in a single piston may be different from each other in at least one of shape and size.

DESCRIPTION OF LETTERS OR NUMERALS 1 piston
3 raised portion
5 bottom surface
5a raised portion (raised bottom surface portion)
11, 12 open surface
21, 22 reentrant surface
111, 112, 211, 221 ridgeline
51 to 54 valve recess surface
71 to 74 top surface
N nozzle
CP central axis
CH cooling channel

The invention claimed is:

1. A compression ignition internal combustion engine comprising:
   a cylinder block and a cylinder head;
   a piston including a cavity that defines a combustion chamber in cooperation with the cylinder block and the cylinder head; and
   a nozzle for injecting fuel into the combustion chamber, wherein
   the cavity includes:
      a raised portion raised toward the nozzle;
      a bottom surface formed around the raised portion; and
      an open surface and a reentrant surface that are continuous to the bottom surface,
   a depth of the open surface becomes shallower toward a radially outer side of the piston,
   a distance from the nozzle to the open surface is greater than a distance from the nozzle to the reentrant surface,
   a height position, in a central axis direction of the piston, of a ridgeline between the bottom surface and the open surface is lower than a height position, in the central axis direction of the piston, of a ridgeline between the bottom surface and the reentrant surface,
   the nozzle injects first and second fuel sprays toward the open surface and the reentrant surface, respectively,
   the nozzle injects a third fuel spray between the first and second fuel sprays,
   the nozzle injects a fourth fuel spray sandwiching the first fuel spray in cooperation with the third fuel spray, and
   when the piston is viewed in the central axis direction, a distance to the nozzle from a point where an outer circumferential edge of the open surface intersects a direction of the third fuel spray is greater than a distance to the nozzle from a point where the outer circumferential edge of the open surface intersects a direction of the fourth fuel spray.

2. The compression ignition internal combustion engine of claim 1, wherein the bottom surface includes a raised bottom surface portion partially raised and positioned between the raised portion and the open surface.

3. The compression ignition internal combustion engine of claim 1, wherein the piston is formed with a valve recess surface continuous to the open surface and positioned higher than the open surface in the central axis direction.

4. The compression ignition internal combustion engine of claim 3, wherein
   the piston includes a top surface positioned higher than the valve recess surface in the central axis direction, and
   the top surface, the valve recess surface, and the open surface are arranged in this order in a direction of a swirl flow generated in the combustion chamber.

5. The compression ignition internal combustion engine of claim 3, wherein
   the piston includes a top surface positioned higher than the valve recess surface in the central axis direction, and
   the open surface, the valve recess surface, and the top surface are arranged in this order in a direction of a swirl flow generated in the combustion chamber.

6. The compression ignition internal combustion engine of claim 1, wherein a height position, in the central axis direction, of the first fuel spray is higher than a height position of the second fuel spray.

7. The compression ignition internal combustion engine of claim 1, wherein when viewed in the central axis direction, an angular interval between the first and third fuel sprays is smaller than an angular interval between the second and third fuel sprays.

8. The compression ignition internal combustion engine of claim 1, wherein
   the piston is provided with a cooling channel through which oil flows along the open surface, and
   the cooling channel is not provided radially outward from the reentrant surface.

9. The compression ignition internal combustion engine of claim 1, wherein
   the piston is provided with a cooling channel through which oil flows along the reentrant surface, and
   the cooling channel is not provided radially outward from the open surface.

10. The compression ignition internal combustion engine of claim 1, wherein
    the open surface includes first and second open surfaces facing each other through the central axis, and
    when viewed in the central axis direction, a direction in which the first and second open surfaces are arranged is positionally displaced from a direction in which a crankshaft extends.

11. The compression ignition internal combustion engine of claim 10, wherein when viewed in the central axis direction, a direction in which two intake valves are arranged is positionally displaced from a direction in which the crankshaft extends and is positionally displaced in a direction of a swirl flow generated in the combustion chamber.

12. The compression ignition internal combustion engine of claim 1, wherein the number of the fuel sprays injected to the open surface is greater than the number of the fuel sprays injected to the reentrant surface.

13. The compression ignition internal combustion engine of claim 1, wherein
    the open surface includes first and second open surfaces facing each other through the central axis,
    the reentrant surface includes first and second reentrant surfaces facing each other through the central axis,
    D1 (mm) stands for a maximum distance between the first and second open surfaces when viewed in the central axis direction,
    D2 (mm) stands for a maximum distance between the first and second reentrant surfaces when viewed in the central axis direction, the nozzle is formed with plural injection holes at equal intervals around the central axis, A (rad) stands for an equal angular interval between adjacent injection holes, and following expressions 1 and 2 are satisfied, $$A \times D2/2 > 5 \qquad \text{(Expression 1)}$$

$$2 > D1/D2 > 1.05 \qquad \text{(Expression 2)}$$

14. The compression ignition internal combustion engine of claim 1, wherein
    the nozzle includes first and second injection holes respectively injecting the first and second fuel sprays, and
    a length of the first injection hole is greater than a length of the second injection hole.

15. The compression ignition internal combustion engine of claim 1, wherein
    the nozzle includes first and second injection holes respectively injecting the first and second fuel sprays, and
    a diameter of the first injection hole is larger than a diameter of the second injection hole.

* * * * *